(12) United States Patent
Rago

(10) Patent No.: US 6,206,090 B1
(45) Date of Patent: Mar. 27, 2001

(54) CONCENTRIC FUEL/OIL FILTERS AND HEAT EXCHANGER PACKAGE

(75) Inventor: Giusseppe Rago, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/315,049

(22) Filed: May 20, 1999

(51) Int. Cl.$^7$ ........................................... F28F 13/12
(52) U.S. Cl. ........................ 165/119; 165/154; 210/183
(58) Field of Search ........................ 165/119, 154; 210/182, 183, 184

(56) References Cited

U.S. PATENT DOCUMENTS

| 2,713,422 | * | 7/1955 | James | 165/119 |
|---|---|---|---|---|
| 3,762,467 | * | 10/1973 | Poon et al. | 165/163 |
| 4,878,536 | * | 11/1989 | Stenlund | 165/119 |
| 4,923,003 | * | 5/1990 | Stenlund | 165/165 |
| 5,326,461 | * | 7/1994 | Legrand et al. | 210/186 |
| 5,406,910 |   | 4/1995 | Wallin . | |
| 5,476,139 | * | 12/1995 | Gire | 165/119 |
| 5,823,987 |   | 10/1998 | Elgas et al. . | |

* cited by examiner

Primary Examiner—Allen Flanigan
(74) Attorney, Agent, or Firm—Jeffrey W. Astle

(57) ABSTRACT

The invention relates to a combined heat exchanger and fluid filter that can be used in a gas turbine engine for example to simultaneously filter lubricating oil and fuel while transferring thermal energy between the oil and fuel. Conventionally, fuel and oil filters as well as a heat exchanger are separately mounted in an engine with a multitude of pipes conducting fluids between them. The invention packages these components together and achieves several benefits as a results, including: reduction in number of parts, cost of manufacture and installation; containment of the risk of damage or leakage; ease of access for assembly, inspection and maintenance; and simple application to a number of different engines by merely extending the length of the filters/exchanger on a standard manifold design.

6 Claims, 3 Drawing Sheets

CONCENTRIC FUEL/OIL FILTERS AND HEAT EXCHANGER PACKAGE

TECHNICAL FIELD

The invention is directed to a compact combined heat exchanger and dual fluid filters that can be used in a gas turbine engine to simultaneously filter lubricating oil and fuel while transferring thermal energy between the oil and fuel.

BACKGROUND OF THE ART

Although the present description uses a gas turbine engine as an example, it will be understood that the present invention and background of the art encompass any application where a heat exchanger is combined with fluid filters in a compact unit.

In many engines, such as internal combustion engines, and in this example, a gas turbine engine, hydrocarbon fuel is pumped with a fuel pump from a fuel tank into the engine via a fuel line. To remove foreign particles and other impurities, a fuel filter typically is positioned as at an accessible point in the fuel line and optionally a fuel air separator as well. The fuel filter is usually a corrugated fabric cylinder positioned at a location in the engine, which is easily accessed for replacement during routine maintenance.

In a like manner, the oil filter is generally a corrugated fabric cylinder positioned at a conveniently accessible location in the oil distribution system. Lubricating oil is cycled between bearings and an oil reservoir, through an oil pump also positioned at an accessible location for routine maintenance.

In the case of a gas turbine engine, the relatively cool incoming fuel from the fuel tank is often used to cool the relatively hot oil scavenged from the bearings through use of a fuel/oil heat exchanger. The fuel is heated by the oil thereby reducing the risk of icing in the fuel circuit. In a gas turbine engine, the heat exchanger is also positioned at a convenient location for access and inspection at a point along the fuel and oil lines.

It is apparent however, that this collection of separate heat exchanger, oil filter and fuel filter require numerous interconnecting oil and fuel lines all of which are subject to damage or leakage. The cost of installing and maintaining separate components and interconnecting conduits, has in the past being considered to be a necessary feature of complex aircraft engine designs especially. However, even conventional mass-produced automobile engines include separate oil and fuel filters, with accompanying conduits.

It is an object of the invention to reduce the number of engine components, particularly the components related to oil filters, fuel filters and heat exchangers in order to simplify engine design and reduce cost of manufacture, assembly and maintenance.

It is a further object of the invention to combine the heat exchanger and at least one fluid filter to produce a robust combined device, which reduces the risk of leakage and a number of interconnecting fluid pipes in an engine.

It is a further object of the invention to produce a combined heat exchanger and fluid filter, which can be easily adapted to a number of different engine specifications in a simple and straightforward modular manner.

It is further object of the invention to replace conventional stacked plate heat exchangers with an inexpensively produced extruded heat exchanger. Further objects of the invention will be apparent from review of the disclosure and description of the invention below.

DISCLOSURE OF THE INVENTION

The invention relates to a combined heat exchanger and fluid filter particularly in a gas turbine engine to simultaneously filter lubricating oil and fuel while transferring thermal energy between the oil and fuel. Conventionally, fuel and oil filters as well as a heat exchanger are separately mounted in an engine with a multitude of pipes conducting fluids among them. The invention packages these components together and achieves several benefits as a result, including: a reduction in the number of parts and the cost of manufacture and installation; containment of the risk of physical damage or leakage; improved access for assembly, inspection and maintenance; and modular standard components to accomodate a number of different engines by merely extending the length of the filters/exchanger on a standard manifold. The combined heat exchanger and filter device has an enclosed housing separated into a first chamber and a second chamber by an impervious heat exchange wall adapted to transfer thermal energy between a first fluid and a second fluid circulated through the first and second chambers. A manifold in the housing has inlets and outlets in flow communication with the first and second chambers respectively, and a fluid filtering medium disposed within one or both of the chambers. Preferably for improved heat transfer between fluids, the inlets and outlets are disposed in the manifold to direct a counter-flow of fluids and the filtering medium is disposed to direct fluid flow normal to the heat exchange wall.

In this way, the fluids are circulated and remain in contact with the heat exchange wall for a relatively long resident period. The preferred arrangement uses standard cylindrical fuels and oil filters nested respectively inside and outside a capped cylindrical heat exchanger wall. The heat exchanger can be an extruded aluminium tube with longitudinal heat transfer fins on inner and outer surfaces that can be produced inexpensively compared to the labour intensive stacked plate heat exchangers conventionally used. The routing of conduits is reduced, as is the overall use of pressurised conduits in the engine. As a result, risk of damage, fire, leakage, exposure to the elements and icing are reduced. Packaging in a combined housing results in a more robust assembly, and ease of access for maintenance and inspection. The concentric enclosure of the fuel filter within the heat exchanger and the heat exchanger within the oil filter, significantly reduces the design pressures which the fuel filter and heat exchanger housing must withstand. The fuel filter and heat exchanger enclosures have no external housing surface, which is not under pressure, unlike conventional separate components. Conventional housings for filters and heat exchangers are externally exposed to atmospheric pressure and must withstand internal pressures of six times the operating pressure to ensure safety. By combining the fuel filter, oil filter and heat exchanger in a single housing, the net pressure resisted by the internally nested components is significantly reduced. Use of a simple cylindrical heat exchanger with internal and external fins significantly reduces the cost of the heat exchanger since very little labour is required during manufacture. An extruded aluminium cylinder can be used for example. Conventional stacked plate heat exchangers require brazing of multiple plates during assembly, with accompanying labour costs.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
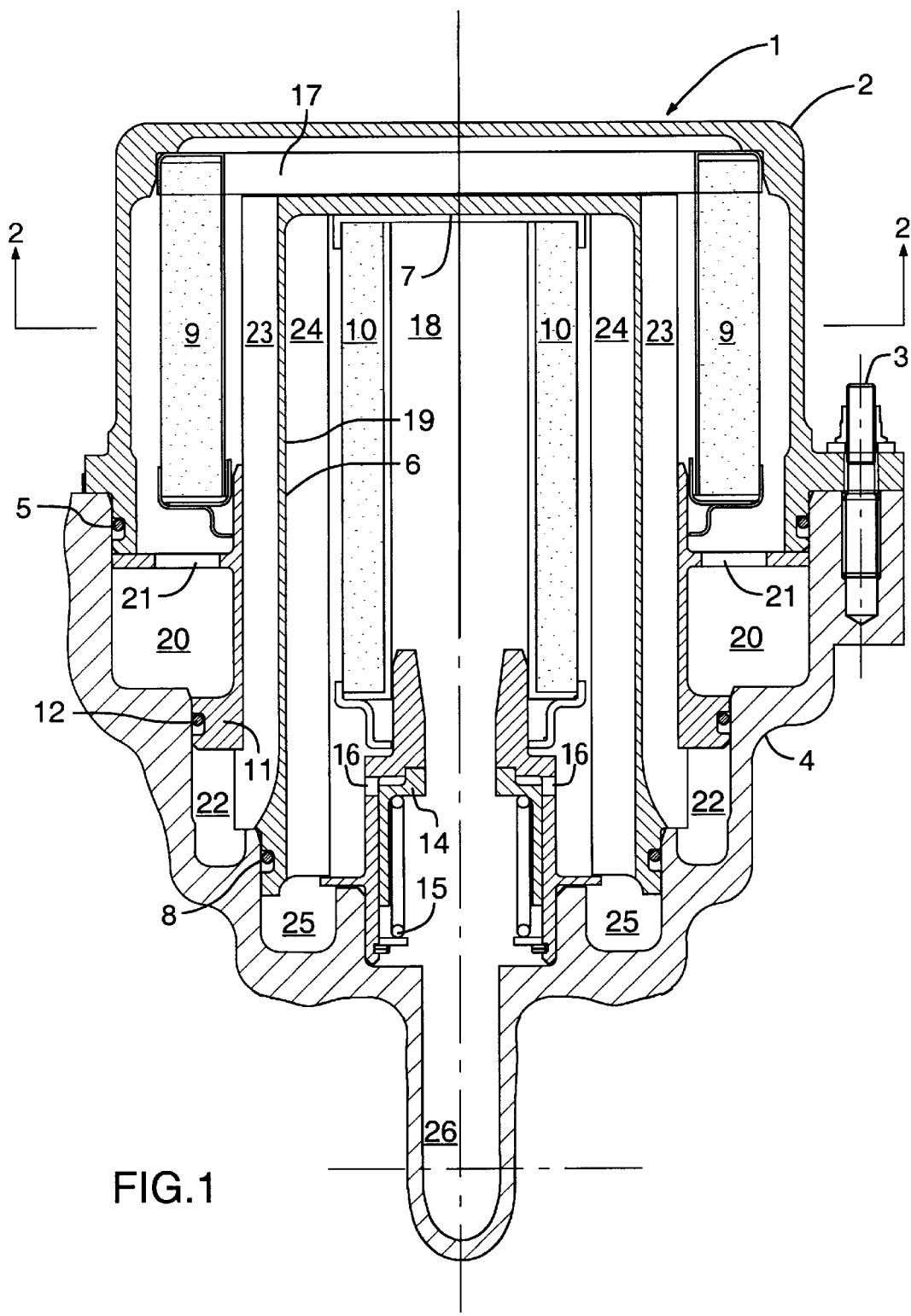
FIG. 1 is an axial cross-sectional view through a combined heat exchanger with an external oil filter and internal fuel filter secured within a combined housing enclosure and mounted with seals to a fuel/oil manifold.
Figure 3:
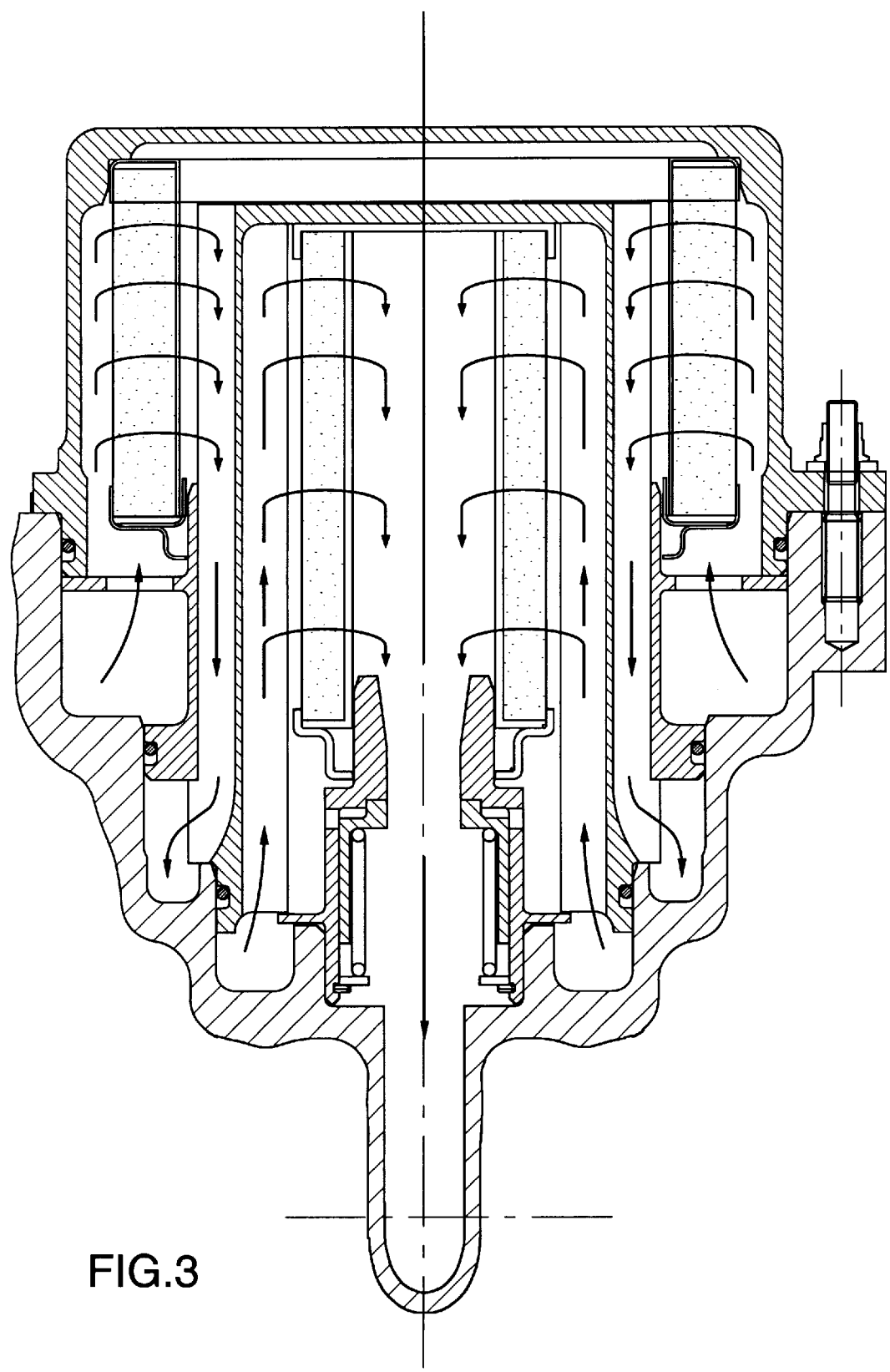
FIG. 3 is an axial cross-sectional view similar to FIG. 1, showing the preferred relative directions of flow of oil and fuel through the filters and across heat exchanger surfaces during operation.

FIGS. 1 and 3 illustrate a combined filter/heat exchanger with two filters for the fluid circulating passed opposing sides of the heat exchanger. It will be understood that the invention also includes a combined filter/heat exchanger with a single fluid filter.

Referring to FIG. 1, the combined heat exchanger and fluid filter includes an external enclosed housing 1 in the embodiment illustrated, comprising a removable bowl 2 secured with bolt studs 3 to a manifold structure 4. The bowl 2 has an enclosing cap on its top surface and it is releasably sealed at the lower peripheral edge to the manifold 4 with an o-ring 5. The heat exchanger 6 is also of a cylindrical shape in the embodiment illustrated with a top enclosing cap 7 and is releasably sealed at the lower peripheral edge to the manifold with an o-ring 8.

In the embodiment illustrated a cylindrical oil filter 9 is disposed outwardly of the cylindrical heat exchanger 6 and a cylindrical fuel filter 10 is disposed inwardly of the heat exchanger 6. A support ring structure 11 is sealed to the manifold 4 with an o-ring 12 and serves to support the oil filter 9 and channel the oil through the housing 1, as described in detail below.

In a like manner, the core structure 13 serves to support the fuel filter 10 and it is mounted to the manifold 4 in a manner to direct the flow of fuel through the filter 10 and within the housing 1 as described below. The core 13 includes a longitudinally sliding valve 14, which is biased to a closed position with a spring 15 to cover orifices 16, as illustrated. In the event that the fuel filter 10 becomes obstructed, vacuum caused by the fuel pump will create a pressure differential sufficient to overcome the force of the spring 15 and result in downward movement of the valve 14 to uncover the orifices 16 thereby permitting fuel flow to bypass the obstructed fuel filter 10.

The enclosed housing 1 is separated into a first oil filled chamber 17 and a second fuel filled chamber 18 by the cylindrical heat exchange wall 19 and enclosing cap 7. The wall 19 and cap 7 function to transfer thermal energy between the oil and fuel as they are circulated through the chambers 17 and 18 respectively. The manifold 4 of the housing 1 includes an annular oil inlet channel 20 in flow communication with the oil filled chamber 17 via openings 21 in the support ring 11.

Figure 2:
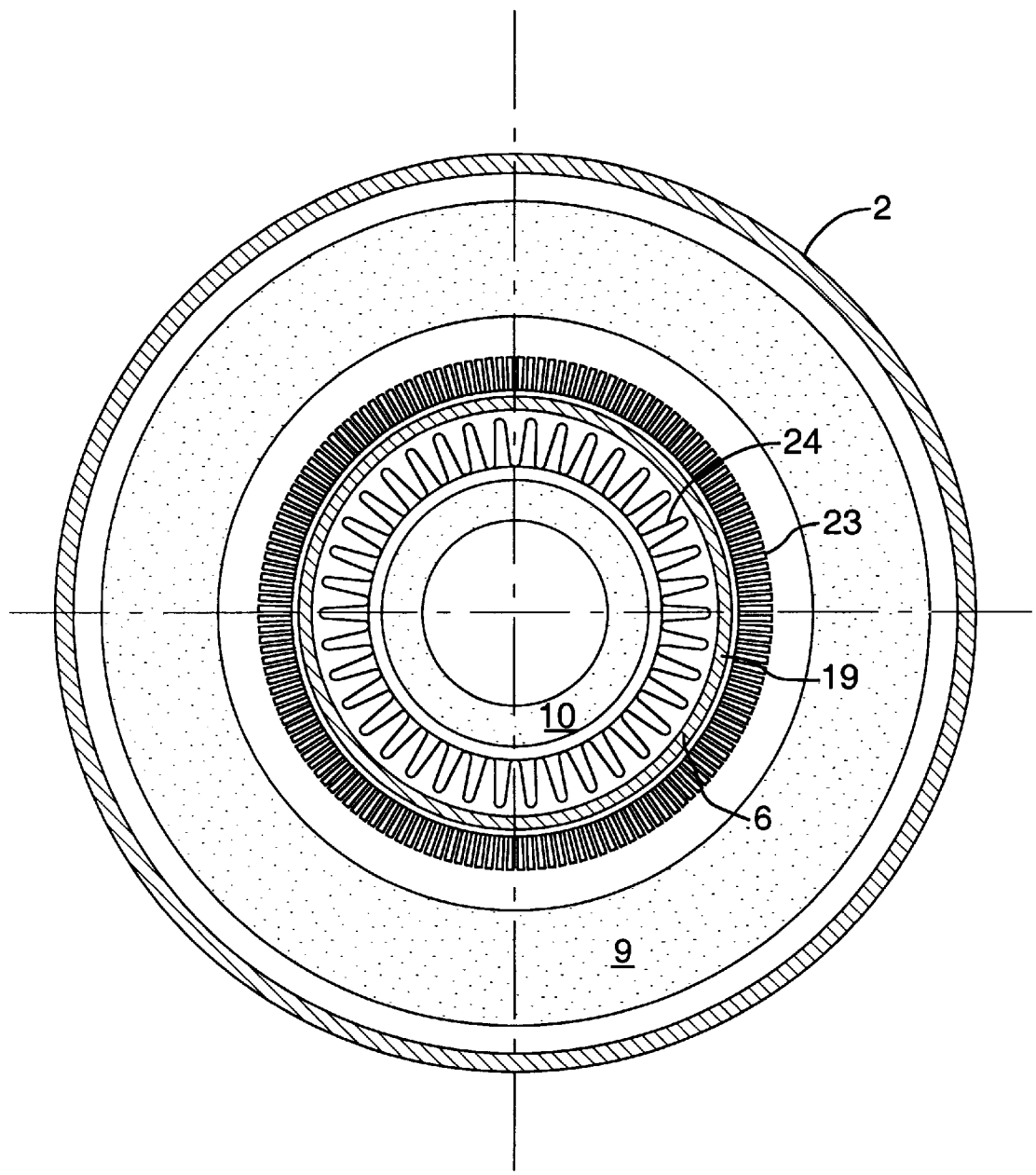
FIG. 2 is a cross-sectional view along lines 2—2 of FIG. 1 showing the concentric arrangement of the internal fuel filter, centrally positioned heat exchanger with fins on internal and external surfaces and the surrounding oil filter, all enclosed in a single outward housing enclosure.

As indicated in FIG. 3, the oil flows upwardly through the openings 21, radially passes through the oil filter 9 and then travels downwardly along the outward surface of the heat exchange wall 19 into an oil outlet channel 22. As shown in FIG. 2, the heat exchange wall 19 has longitudinal heat transfer fins 23 on the outer surfaces and heat transfer fins 24 on the inner surfaces. In the illustrated embodiment, the inner fins 24 in contact with the unfiltered fuel have a width larger than the width of the outer fins 23 in contact with the filtered oil on the outer surface to reduce the risk of clogging the fins 24 with foreign particles. As illustrated the cap 7 of the heat exchanger 6 does not include any heat transfer fins, however it will be understood that the cap 7 surface facilitates heat transfer to a degree, and may be fitted with fins if desired.

With reference to FIGS. 1 and 3, it can be seen that the oil and fuel are directed in a counterflow direction in contact with opposing sides of the heat exchange wall 6 and fins 23 and 24 by the selection and positioning of the inlets and outlets for the fuel and oil. Examining the circulation of fuel within the fuel filled chamber 18, the manifold 4 of the housing 1 includes an annular fuel inlet channel 25 that under pressure directs fuel upwardly between the inner fins 24 of the heat exchanger 6. The fuel then passes radially across the fuel filter 10 and is collected within the core structure 13 for withdrawal through the fuel outlet channel 26.

For efficient manufacture, simplicity of filter design and heat exchanger design, preferably the heat exchange wall 19 and inner fuel filled chamber 18 are cylindrical with the outer oil filled chamber 17 outwardly annular and coaxial thereto. This arrangement has the advantage that the oil filter 9 and the fuel filter 10 direct fluid flow normal to the heat exchange wall 19. The transverse or radial flow of oil and fuel tend to circulate the fluids in the chambers 17, 18 and create turbulence, to aid in the exchange of thermal energy.

As can be clearly seen in FIG. 3, the circulation of fuel and oil within the concentric fuel filter 10, heat exchanger 6 and oil filter 9 has the advantage of compact construction and modularity. The manifold 4 can be designed as a standard part for use in a number of different engines. To increase the filtering and heat exchange capacity, the designer merely longitudinally extends the length of the filters 9 and 10, heat exchanger 6 and length of housing bowl 2. The surface area of these components is increased and the resulting filtering and heat exchanging capacity is increased by extending the length without increasing the diameter of the combined nested heat exchanger/filter components. As a result a standard manifold 4 can serve a number of engines. The manufacture of filters 9, 10 and heat exchangers 6 can also be standardized to a selected diameter, with different capacities accommodated by modifying the length only.

Although the above description and accompanying drawings relate to a specific preferred embodiment as presently contemplated by the inventor, it will be understood that the invention in its broad aspect includes mechanical and functional equivalents of the elements described and illustrated.

What is claimed is:

1. A combined heat exchanger and fluid filter comprising:
    an enclosed housing separated into a first chamber and a second chamber by an impervious heat exchange wall adapted to transfer thermal energy between a first fluid and a second fluid circulated through the first and second chambers respectively, the housing including first and second inlets and outlets in flow communication with the first and second chambers respectively wherein the heat exchange wall and first chamber are cylindrical and wherein the second chamber is outwardly annular and coaxial thereto; and
    a fluid filtering medium disposed within each of said chambers;
    wherein the housing comprises an outer bowl, the bowl and the heat exchange wall each having an enclosing cap at one end and releasably sealed at an opposite peripheral edge thereof to a manifold, the manifold including said inlets and outlets disposed to direct a counterflow of said fluids in contact with opposing sides of the heat exchange wall.

2. A combined heat exchanger and fluid filter according to claim 1 wherein said fluid filtering medium is disposed to direct fluid flow normal to the heat exchange wall.

3. A combined heat exchanger and fluid filter according to claim 1 wherein the heat exchange wall has longitudinal heat transfer fins on inner and outer surfaces thereof.

4. A combined heat exchanger and fluid filter according to claim 3 wherein the longitudinal heat transfer fins on the inner surface each have a width larger than the width of the fins on the outer surface.

5. A combined heat exchanger and fluid filter according to claim 1 wherein the first chamber is disposed inwardly of the heat exchange wall and the first fluid comprises liquid fuel.

6. A combined heat exchanger and fluid filter according to claim 5 wherein the second fluid comprises oil.

\* \* \* \* \*